June 5, 1923.
G. H. WIGTON ET AL
1,458,016
METHOD OF TREATING SILICIOUS ORES
Filed Aug. 5, 1922
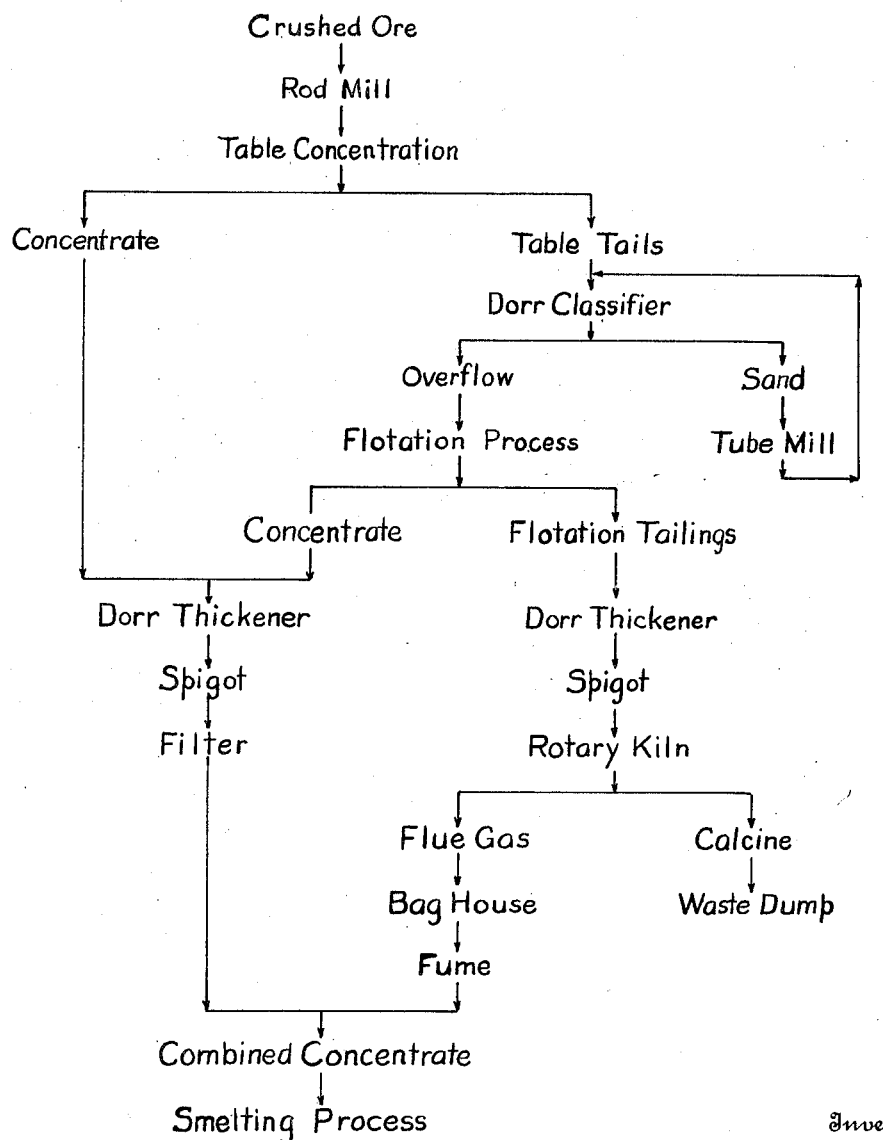
Inventors
George H. Wigton
Samuel M. Seddon
By Church & Church
Their Attorneys Patented June 5, 1923.

1,458,016

UNITED STATES PATENT OFFICE.

GEORGE H. WIGTON, OF EUREKA, AND SAMUEL M. SEDDON, OF SALT LAKE CITY, UTAH.

METHOD OF TREATING SILICIOUS ORES.

Application filed August 5, 1922. Serial No. 579,883.

*To all whom it may concern:*

Be it known that we, GEORGE H. WIGTON and SAMUEL M. SEDDON, citizens of the United States, residing, respectively, at Eureka, in the county of Juab and State of Utah, and at Salt Lake City, in the county of Salt Lake and State of Utah, have invented certain new and useful Methods of Treating Silicious Ores; and we do hereby declare the following to be a full, clear, and exact description of the same.

This invention relates to the concentration of such silicious ores in which the valuable minerals are either partially or entirely oxidized and are therefore not recoverable in substantial proportion by standard concentration methods, the method here outlined being particularly adapted to silicious ores containing oxidized lead, silver and gold minerals. The object of the present invention is to provide a process of treatment of oxidized mineral silicious ore which will recover the valuable minerals which escape recovery by standard concentration methods thereby reducing the treatment cost as compared to that of the direct smelting of the ore. Further objects of the present invention are the provision of a process which will eliminate all use of a chloridizing agent and one in which the collected fume may be directly treated by the usual lead smelting methods without the need of an intermediate step or process for the concentration of certain ingredients to a non-volatile form. By eliminating the chloridizing agent the troublesome furnace sintering will also be obviated and a flue gas will be produced which, owing to the absence of all free chlorine and hydrochloric acid, will permit the successful use of bag-filtration methods. In chloride volatilization too the sodium silicate derived from the reaction of common salt with the ore constituents is fusible at low temperatures and is therefore objectionable.

The advantages of concentration before smelting are well known. It is also well known that standard concentration methods recover in the concentrate so small a portion of the valuable minerals in oxidized ore that they have not been successfully used in concentrating this class of ore.

In the Patent No. 1,264,586, of George H. Wigton, one of the present applicants, a process is described which consists in concentrating the ore by standard concentration methods, such as "gravity concentration" and flotation and subjecting that tailing to treatment by a process known as "chloride volatilization." In carrying out this method in a plant designed especially for it we have discovered that under certain conditions the addition of chlorides to the volatilization treatment is unnecessary as we can obtain a higher extraction and a more desirable product if no chloride whatever is added to the volatilization process. We have also discovered that if the flotation concentration is omitted on partially oxidized ores we could make only an incomplete extraction by volatilization alone. From these facts we conclude that the class of minerals normally recovered by flotation is difficult to volatilize without the addition of salt or other chloridizing agent.

The drawings show a flow-sheet which illustrates a practical application of the process.

While the procedure outlined is the preferred one, it is to be understood that a number of variations may be made in the procedure without affecting the principle of the method. For example, there might not be enough coarse valuable mineral in an ore to warrant the use of gravity concentration; or the sandy portion of an ore might not require the treatment by flotation if it be sufficiently free from floatable minerals after treatment by gravity concentration. Also, the flotation tailing may be added either dry or wet to the volatilization furnace; other types of volatilization furnaces may be used; and other fume-collecting devices may be used.

In the preferred method gravity concentration removes the coarse heavy minerals, such as cerrusite, galena, pyrite, and native silver; flotation removes the remaining natural sulphides and some native gold and silver; and volatilization removes most of the remaining oxidized lead, silver, and gold minerals.

The feed for the volatilization should preferably be a slurry, similar to that used as feed for rotary kilns in the cement manufacturing plants. The addition of the feed in this form has the advantages that the process is simplified by the elimination of filters and dryers and that the dusting in the volatilization furnace is reduced to a minimum.

Excellent results have been secured in a rotary kiln by this method, by firing at the discharge end, altho if a dry or only moist feed is used, the kiln should be fired at the feed end in order to reduce the dusting. It is preferable to feed a slurry to the kiln and to fire at the discharge end, because the fed can then be subjected to a high finishing temperature; good results however have been obtained by firing at the feed end.

High temperature plays a very important part in volatilization without salt, a higher temperature being necessary than that used in the chloride volatilization process. For practical purposes, the working temperature in the burning zone should be just below the melting temperature of the ore, and should be at least 1700° F., care being taken to prevent actual fusion. From actual tests we have found that the most desirable temperature in the burning zone will range from 2000° F. to 2200° F. At least a slightly oxidizing atmosphere should be maintained in the volatilization furnace. As practically all of the sulphides will be removed by preliminary concentration methods, there will be enough metallic oxides in the furnace feed and fume, to neutralize any free acid formed, and the fume will therefore be basic. We have found this to be a fact in actual practice. As the well known bag-filtration method is especially adapted to a fume of this class, its use for recovering the fume from the flue-gas is recommended, and has been found to be satisfactory. However we do not confine ourselves to this method of fume collection.

The fume concentrate will contain no deleterious elements that are not present in the ore and can therefore be combined with the concentrates from the gravity concentration and flotation operations and treated by methods in use at the lead smelters.

What we claim is:—

1. The process of treating oxidized, silicious, lead, silver, and gold ores which consists in subjecting the ground ore to a temperature above 1700° F. and below its melting point, exposing it at that temperature to a current of oxidizing gas, and separating the volatilized metals from the flue gas by a suitable fume-collecting device.

2. The process of treating oxidized, silicious, lead, silver, and gold ores, which consists in first treating the ground ore by gravity concentration and flotation methods; then subjecting the concentration tailing to a temperature above 1700° F. and below its melting point, exposing it at that temperature to a current of oxidizing gas and separating the volatilized metals from the flue-gas by a suitable fume-collecting device.

3. The process of treating partially oxidized, lead, silver, and gold ores, which consists in first treating the ground ore by gravity concentration and flotation methods; then subjecting the concentration tailing to a temperature above 1700° F. and below its melting point, exposing it at that temperature to a current of oxidizing gas, and separating the volatilized metals from the flue-gas by a suitable fume-collecting device.

4. The method of treating silicious ores containing oxidized lead, silver, and gold which consists in removing the coarse heavy minerals by gravity concentration, removing the remaining natural sulphides together with native precious metals by a flotation process; feeding the remaining oxidized minerals as a slurry to a temperature of from 1700° F. to 2500° F. in an oxidizing atmosphere; collecting the fume, and in smelting the combined concentrates.

5. The process of treating oxidized silicious ores containing volatilizable values, which consists in subjecting the ground ore to a temperature above 1700° F. and below its melting point, exposing it at that temperature to a current of oxidizing gas, and separating the volatilized metals from the flue gas by a suitable fume-collecting device.

6. The process of treating oxidized, silicious ores containing volatilizable values, which consists in first treating the ground ore by gravity concentration and flotation methods; then subjecting the concentration tailing to a temperature above 1700° F. and below its melting point, exposing it at that temperature to a current of oxidizing gas and separating the volatilized metals from the flue-gas by a suitable fume-collecting device.

7. The process of treating partially oxidized ores containing volatilizable values, which consists in first treating the ground ore by gravity concentration and flotation methods; then subjecting the concentration tailing to a temperature above 1700° F. and below its melting point, exposing it at that temperature to a current of oxidizing gas, and separating the volatilized metals from the flue-gas by a suitable fume-collecting device.

8. The method of treating oxidized silicious ores containing volatilizable values which consists in removing the coarse heavy minerals by gravity concentration, removing the remaining natural sulphides together with native precious metals by a flotation process; feeding the remaining oxidized minerals as a slurry to a temperature of from 1700° F. to 2500° F. in an oxidizing atmosphere; collecting the fume, and in smelting the combined concentrates.

GEORGE H. WIGTON.
SAMUEL M. SEDDON.